United States Patent
Tao et al.

(10) Patent No.: US 7,826,848 B2
(45) Date of Patent: Nov. 2, 2010

(54) COOPERATIVE COMMUNICATION IN WIRELESS CELLULAR NETWORKS

(75) Inventors: Zhifeng Tao, Allston, MA (US); Tairan Wang, Minneapolis, MN (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 631 days.

(21) Appl. No.: 11/931,378

(22) Filed: Oct. 31, 2007

(65) Prior Publication Data

US 2009/0111473 A1  Apr. 30, 2009

(51) Int. Cl.
*H04W 36/00* (2009.01)
(52) U.S. Cl. .................. 455/436; 455/444; 455/442; 455/450; 370/331
(58) Field of Classification Search ......... 455/436–444, 455/524–525; 370/331–345
See application file for complete search history.

(56) References Cited

U.S. PATENT DOCUMENTS

| | | | |
|---|---|---|---|
| 2003/0109284 A1* | 6/2003 | Akerberg et al. | 455/561 |
| 2003/0142647 A1* | 7/2003 | Agrawal et al. | 370/331 |
| 2009/0225720 A1* | 9/2009 | Molisch et al. | 370/330 |

* cited by examiner

Primary Examiner—Kamran Afshar
(74) Attorney, Agent, or Firm—Dirk Brinkman; Gene Vinokur

(57) ABSTRACT

A method and system communicates cooperatively between base stations and mobile stations in a wireless cellular network. At least two mobile stations are detected in a handover region. A diversity set is established for each mobile station in the handover region. Each diversity set identifies at least two base stations that can communicate with the associated mobile station. The at least two base stations and the at least two mobile stations are combined into members of a cooperation set. A resource is allocated to selected members of the cooperative set. The selected members are notified of the allocated resource. Then, the selected base stations of the cooperation set communicate concurrently with the selected mobile stations using the same allocated resource.

19 Claims, 7 Drawing Sheets

COOPERATIVE COMMUNICATION IN WIRELESS CELLULAR NETWORKS

FIELD OF THE INVENTION

This invention relates generally to wireless networks, and more particularly to cooperative communication between stations in wireless cellular networks.

BACKGROUND OF THE INVENTIONS

Inter-Cell Interference (ICI)

A wireless cellular network includes base stations (BSs) and mobile stations (MSs) arranged in cells. The BSs and MSs include transceivers. The mobile stations are frequently called 'users' or subscriber stations. The stations communicate signals with each other using channel resources, i.e., time and frequency. The same resources may be used in adjacent cells. This can cause inter-cell interference (ICI) in regions where the signals in the cells physically overlap. Because the power of the ICI at a receiver can be much greater than the power of noise, ICI is a major limitation of the spectral efficiency of wireless cellular networks.

Spatial Division Multiple Access (SDMA)

SDMA provides multi-user channel access by using multiple-input multiple-output (MIMO) techniques with precoding and multi-user scheduling. SDMA exploits spatial information of the location of MSs within the cell. With SDMA, the radiation patterns of the signals are adapted to obtain a highest gain in a particular direction. This is often called beam forming or beam steering. BSs that support SDMA transmit signals to multiple users concurrently using the same resources. SDMA can increase network capacity, because SDMA enables spatial multiplexing. Nevertheless, the ICI still remains a key issue, even if SDMA is used.

Macro Diversity Handover (MDHO)

During macro diversity handover, multiple base stations transmit the same signal to single MS in a handover (HO) region. Macro diversity increases the received signal strength and decreases fading in the HO region. MDHO is used when the MS moves from one cell to another. The transfer is accomplished in the downlinks (DLs) from the BSs to the MS by having the BSs transmit multiple copies of the same information to the MS so that either RF combining or diversity combining can be performed by the MS.

In the uplink (UL) from the MS to the BSs, the transfer is accomplished by having two or more BSs receiving the same signal from the MS in the HO region so that selection diversity can use the 'best' uplink. MDHO can reduce the ICI even though the same resources are used for the same signal. However, MDHO wastes resources because the MS uses the resources from more than one cell, which could otherwise be used by other MSs.

Diversity Set Establishment

As shown in FIG. 3, conventional MDHO begins when a MS is detected 305 in the HO region. Either the MS or the BS can initiate establishment of a diversity set 310, as determined in step 311. The diversity set 310 consists of only the base stations that are capable of communicating with the MS in the HO region. In the case of the BS, the BS transmits a MOB_B-SHO_REQ message 312. In the case of the MS, the MS transmits a MOB_MSHO_REQ message 313 and a MOB_B-SHO_RSP message 314. In either case, the diversity set is confirmed with the MOB_HO_IND message 315. The messages are defined in detail in the applicable standards.

According to the IEEE 802.16 standard, MDHO and SDMA are optional and independent protocols between the BSs and the MSs. It is desired to improve cooperation between stations in wireless cellular mobile wireless networks using MDHO and SDMA.

SUMMARY OF THE INVENTION

Embodiments of the invention perform cooperation between stations in a wireless cellular network by using macro diversity handover (MDHO) and spatial division multiple access (SDMA). The stations involved in the cooperation are grouped in a cooperation set, which comprises two or more base stations and two or more mobile stations. The multiple BSs in the cooperation set transceive with the multiple MSs using the same allocated channel resource, i.e., time and subchannels.

More particularly, a method and system communicates cooperatively between base stations and mobile stations in a wireless cellular network. At least two mobile stations are detected in a handover region. A diversity set is established for each mobile station in the handover region. Each diversity set identifies at least two base stations that can communicate with the associated mobile station.

The at least two base stations and the at least two mobile stations are combined into a cooperation set. A resource is allocated to selected base and mobile stations of the cooperative set. The selected base and mobile stations are notified of the allocated resource.

Then, the selected stations of the cooperation set communicate concurrently with each other using the same allocated resource.

DETAILED DESCRIPTION OF THE PREFERRED EMBODIMENTS

Wireless Cellular Network

Figure 1:
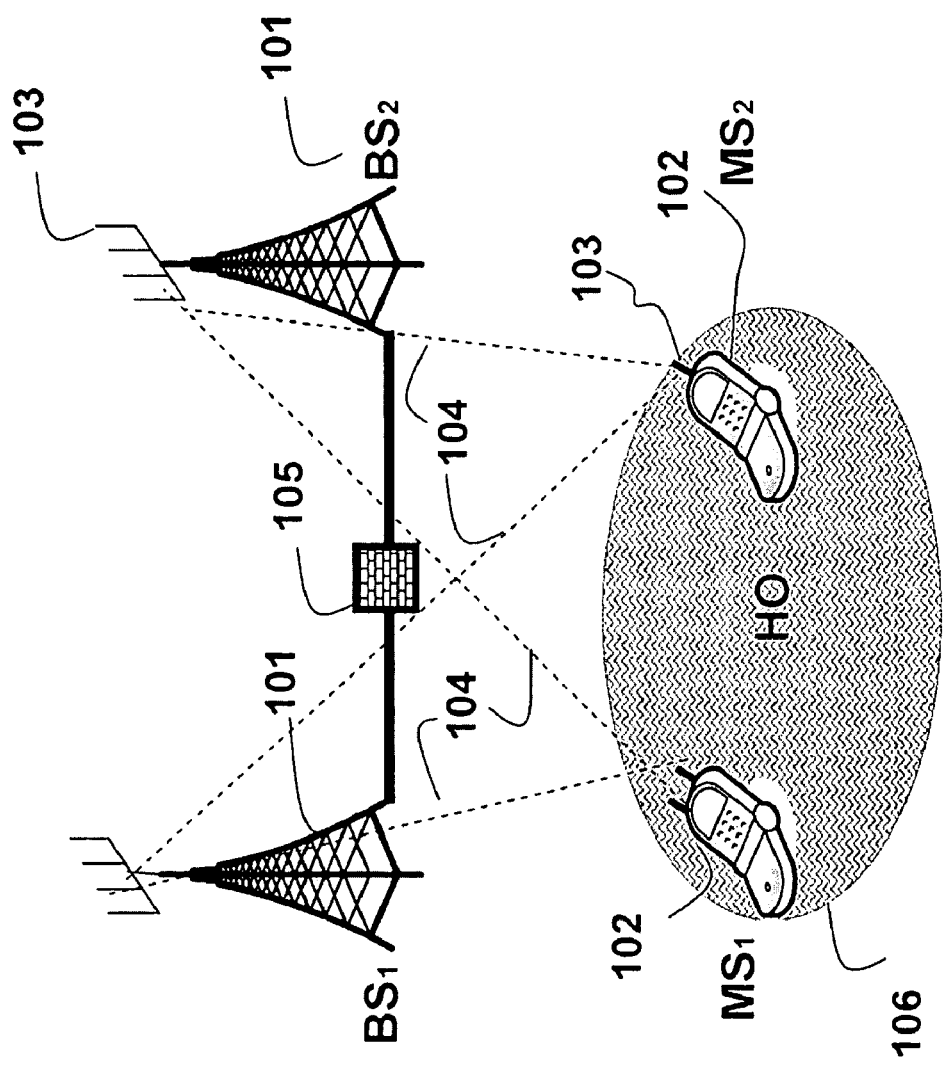
FIG. 1 is a schematic of a wireless cellular network used by embodiments of the invention.

FIG. 1 shows a wireless cellular network according to an embodiment of our invention. The network includes a set (two or more) of base stations (BSs) 101, and a set (two or more) of mobile stations (MSs) 102. Each station includes a transceiver. The transceivers are connected to a set of antennas 103. The dashed lines 104 indicate channels (links) between the transceivers.

A backbone or infrastructure 105 connects the BSs. Typically, the infrastructure includes wired and wireless connections, and processors that perform the high-level network functions as described herein. Base stations usually communicate with each other via the backbone 105 to exchange control information, channel information and even data traffic, which makes it possible for base stations to perform joint encoding and decoding.

The range of the signals from a base station defines a cell. Where signals from base stations overlap is known as a handover (HO) region 106.

In cooperation according to our invention, multiple (two or more) base stations coordinately communicate with multiple (two or more) MSs using the same resource, time and frequency. Cooperation can reduce ICI and improve spectral efficiency.

Frame Structure

Figure 2:
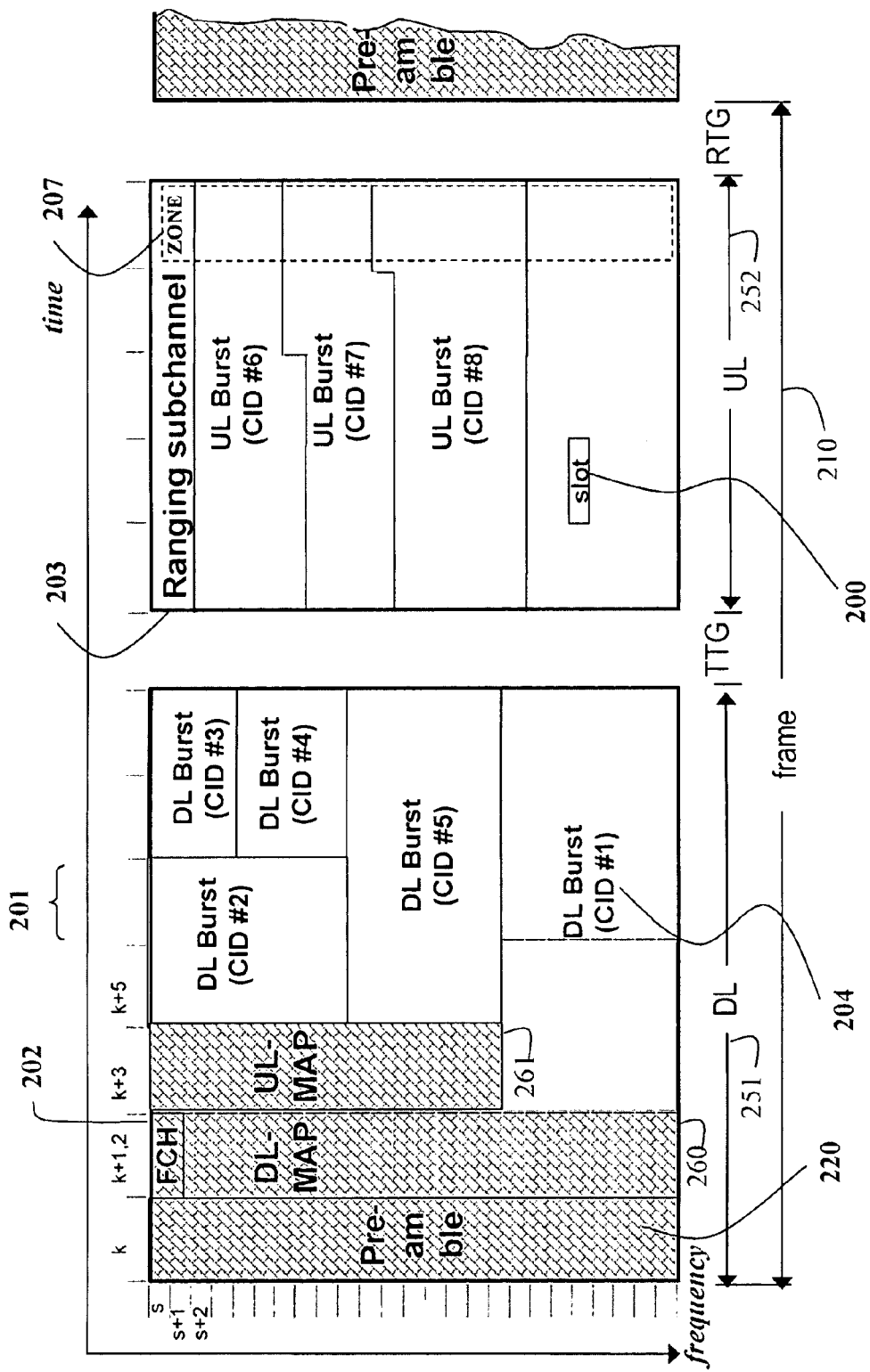
FIG. 2 is a block diagram of a frame structure used by embodiments of the invention.
Figure 3:
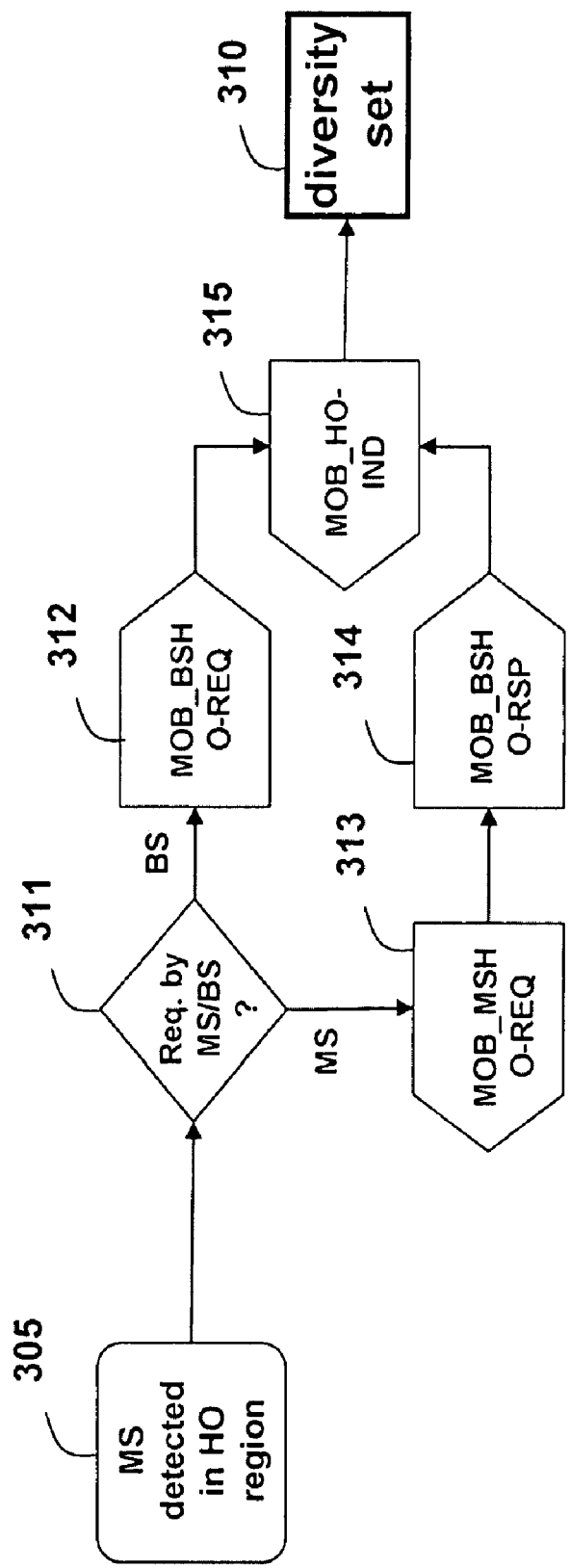
FIG. 3 is a flow diagram for conventional macro diversity handover.

FIG. 2 shows a frame structure used for OFDMA channel access by the cooperating BS and MS according to our invention. In FIG. 2, the horizontal axis indicates time domain resources, and the vertical axis indicates subchannel (frequency) domain resources. Each subchannel can include one or more subcarriers The basic unit of resource for allocation in OFDMA is a slot 200. The size of the slot is based on the permutation modes that the MS and the BS use for transmissions in uplink and downlink. A permutation mode defines the type of resource allocation in time and frequency domains. Different modes are defined for the UL and the DL. By using a specific permutation, a given number of OFDMA symbols 201 and subchannels are included in each slot.

The slot has an associated time (k) and subchannel (s). Each slot can carry one or more symbols. The base station partitions the time domain into contiguous frames 210 including a downlink (DL) subframe 251 and an uplink (UL) subframe 252. During the downlink subframe, all traffic is from the base stations to the mobile stations. During the uplink subframe, all traffic is from the mobile stations to the base stations.

The DL subframe starts with a preamble 220 on all subchannels. The preamble enables the mobile stations to perform synchronization and channel estimation. The first subchannel in the first two OFDMA symbols in the downlink is the frame control header (FCH) 202. The FCH is transmitted using QPSK rate ½ with four repetitions. The FCH specifies a length of the immediately succeeding downlink MAP (DL-MAP) 260 and the repetition coding used for the DL-MAP.

The BS uses the downlink MAP (DL-MAP) and an uplink MAP (UL-MAP) 261 to notify the MSs of the resources allocated to data bursts 204 in the downlink and uplink direction, respectively, within the current frame. The bursts are associated with connection identifiers (CID). Based upon a schedule received from the BS, each MS can determine when (i.e., OFDMA symbols) and where (i.e., subchannels) the MS should transceive (transmit or receive) with the BS. The first two subchannels 203 in the UL subframe are used for ranging.

A receive/transmit gap (RTG) separates the frames, and a transmit transition gap (TTG) separates the subframes within a frame. This enables the transceivers to switch between transmit and receive modes.

Data signals (OFDMA symbols) are transmitted in bursts 204 comprising one or more slots. Each channel or connection 104 between the BS and the MS is allocated a time domain and frequency domain resource, which contains a two dimensional block, i.e., time duration and frequency subchannels. With OFDMA, stations can communicate with each other on the connections 104 by using the allocated two-dimensional resources.

In networks that use time division duplexing (TDD), the DL and UL subframe share the same frequency band in each frame. The frame duration for an IEEE 802.16 network is about 10 ms, which is typically less than the channel coherence time. Hence, it is reasonable to assume that the channel state information (CSI) for UL and DL channels are reciprocal. Thus, the CSI acquired at the BS for uplink is similar to the CSI perceived by the MS in a subsequent downlink communication. Otherwise, if the UL and DL are not reciprocal, the BS can request feedback from the MS to precode the data accordingly.

Cooperation

According to the embodiments of our invention, two or more base stations and two or more mobile stations can transceive cooperatively and concurrently. The cooperating base and mobile stations are grouped into a cooperation set at least two base stations and at least two mobile stations. Cooperation increases the spectral efficiency of the network.

This is different than conventional MDHO where multiple base stations communicate with only one mobile station. This is also different than conventional SDMA where only one base station communicates with multiple mobile stations.

In our network, one base station is selected to be the anchor base station to coordinate the DL and UL transmissions for all the base stations and mobile stations involved in the cooperation. Note, the term anchor BS is from the MS's perspective. Different MSs can use different BSs as their anchors.

In the cooperation according to our invention, the anchor BS allocates different pilot patterns to different MSs to guarantee the pilot associated with each MS is orthogonal, thereby enabling each MS to successfully estimate the channel using the received pilot. However, the same data subchannels are shared by all the MSs involved in the cooperation for data traffic transmissions.

The MSs are notified prior to the actual DL transmission whether the MS should perform (1) RF combining or (2) soft data combining, because the same DL resource is used by multiple BS in the first case, while different resource are used by different BS in the second case.

During the UL, multiple MSs are transmitting and each transmit antenna uses a different pilot pattern, as allocated by the BS. Multiple BSs involved in the cooperation can exchange information to perform joint decoding, or the BSs can decode multiple copies of the information independently with multiple antennas, and the anchor BS selects the copy that is successfully decoded. The transmit power in the uplink is specified by the BS in the UL MAP message.

The IEEE 802.16e standard defines the protocol, MAC message and PHY support for SDMA and MDHO separately. In contrast, our invention combines the SDMA and MDHO to enable our cooperation. Moreover, we also describe how various cooperation sets can be grouped, updated and terminated. In addition, we describe MAC signaling protocols to support the cooperation of our invention.

Cooperation Using SDMA and MDHO Protocols

Figure 4:
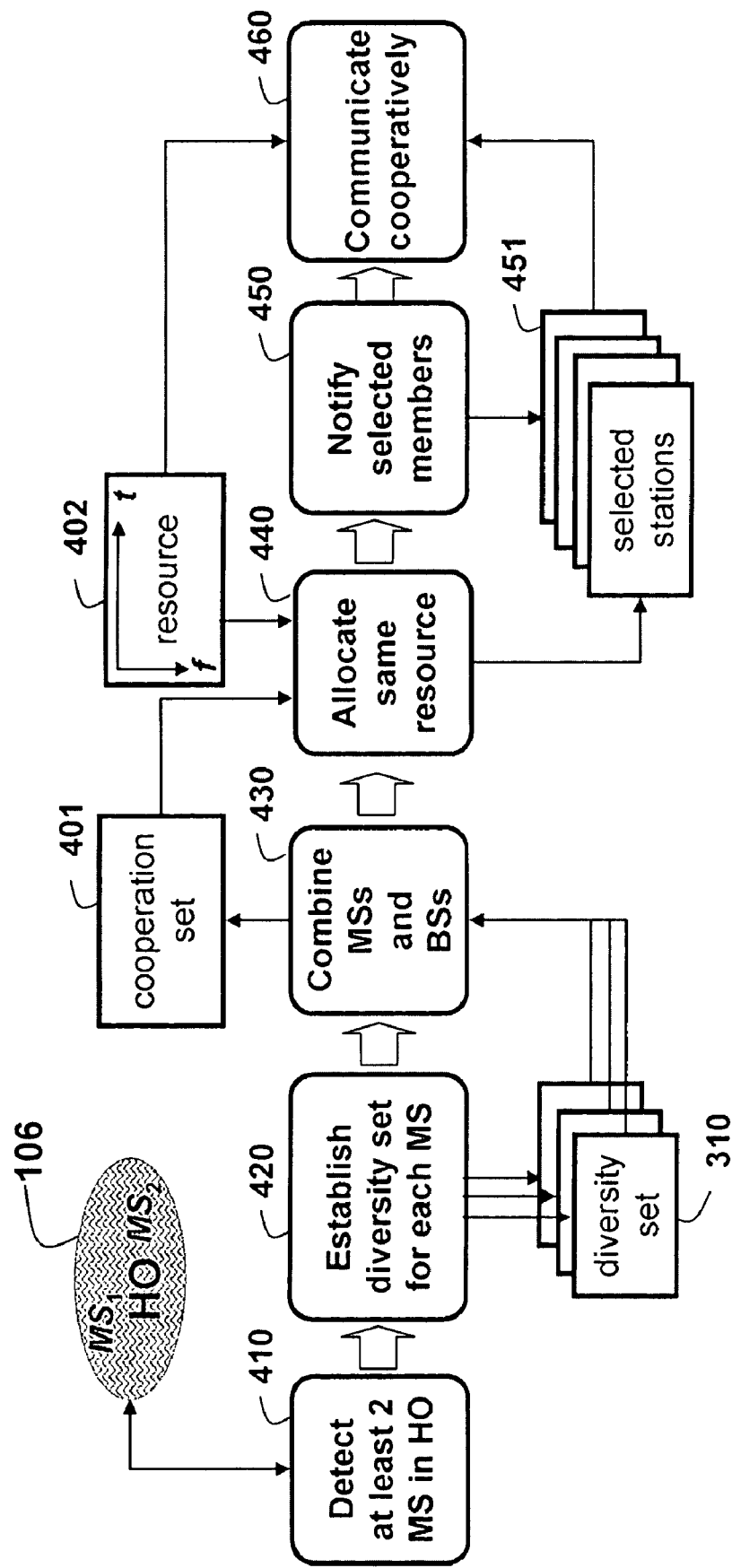
FIG. 4 is a flow diagram of cooperation between stations according to embodiments of the invention.

As shown in FIG. 4, our cooperation begins when at least two mobile stations 102 are detected 410 in the handover zone 106. A diversity set 310 is established 420 for each mobile station in the HO region. The diversity set identifies the multiple base stations that can communicate with the associated MS. The base stations in the diversity sets 310 and the associated mobile stations are combined 430 to form a cooperation set 401. A resource (time and frequency domains) 402 is allocated 440 to selected base and mobile stations 451 of the cooperative set. The selected members are notified 450 of the resource allocation. Then, the selected members can communicate concurrently 460 between each other using the same selected resource 402. The resource allocation can be performed on a frame-by-frame basis. It is also possible to update the cooperation set on demand or dynamically as mobile stations enter and leave the HO region.

Initialization

To perform the cooperation, the MSs inform the BSs of cooperation capability by exchanging messages with the BS. It is assumed that all BSs support conventional MDHO and SDMA to exchange such messages. Specifically, when the MS joins the network and performs initialization, the MS transmits a registration request (REG-REQ) message to indicate to the BS that the MS supports cooperation. Table 1 shows the format of REG-REQ message. Bit 5 is used to indicate an ability to support cooperation according to the invention.

Alternatively, the MS can transmit a Basic Capability Request (SBC-REQ) message to indicate to the BS that the MS can perform cooperation. The format of SBC-REQ message is shown in Table 2. Here, bit 2 is used to indicate support for cooperation according to the invention. The MS can also transmit both the REG-REQ and the SBC-REQ messages to the BS.

Diversity Set and Anchor BS Update

The IEEE 802.16 standard specifies the diversity set 310 for the MDHO. The diversity set, which is defined for a particular MS, comprises at least two base stations, all of which participate in the transmission in the downlink to that particular MS. Among a diversity set associated to an MS, there is a BS that assumes the role of primary control, and hence is usually called the anchor BS for that MS.

For each MS, the diversity set contains all the base stations with a mean carrier-to-interference-and-noise ratios (CINRs) higher than H_Add Threshold. The diversity set 310 can be updated by either the MS or the BS. The BS candidate to be added into the diversity set has a CINR higher than H_Add Threshold during a signal strength measurement, while the BS candidate to be removed from the diversity set has a CINR lower than H_Delete Threshold during the signal strength measurement.

When MOB_MSHO-REQ message is transmitted by the MS, the MS can provide a possible list of BSs to be included in its diversity set. The MS can evaluate the possible list of BSs through the received MOB_NBR-ADV message, and previously performed signal strength measurements, propagation delay measurements, scanning, ranging, and other related activities.

When the MOB_BSHO-REQ message is transmitted by the BSs in the MS's current diversity set, the BSs can provide a recommended list of BSs to be included in the MS's diversity set. The criteria for the recommendation can be based on expected QoS performance. The list of BSs that can be involved in MDHO SS is broadcast in the MOB_NBR-ADV message. The MS can confirm the diversity set update in MOB_HO-IND message 315, with MDHO_IND_type field in the MOB_HO-IND message set to 0b00.

The MS can reject the diversity set recommended by the anchor BS by setting the MDHO_IND_type field in the MOB_HO-IND message to 0b10 (Diversity Set Update Reject).

The BS can reconfigure the diversity set and retransmit the MOB_BSHO-RSP message to the MS. After the MS or the BS has initiated a diversity set update using either of the MOB_MSHO/BSHO-REQ messages. The MS can cancel the diversity set update at any time. The cancellation is made through transmission of the MOB_HO-IND message with the MDHO_IND_type field set to 0b01.

One BS is selected to be the anchor BS within the diversity set based on the CINR measurement. The anchor BS is updated when the MS prefers a new BS to be the anchor BS through previously performed signal strength measurement. The BS determines the target anchor BS based on the MS preference. Note that the members of diversity set and the anchor BS are known to the BSs in the diversity set and to the MS.

We now describe the details of using of the MDHO and SDMA for base and mobile station cooperation.

Cooperation Set Establishment

For the base and mobile station cooperation, we define a cooperation set 401 according to an embodiment of the invention. It is possible that the diversity sets 310 of different MSs in the same handover region 106 have a non-empty intersection. That is, there are the same BSs that belong to the diversity set of different MSs in the same HO region. These BSs can be members of the cooperation set to serve a group of MSs using the same resource. The MSs that have the non-empty diversity sets may also be members of the cooperation set, because the MSs may be able to participate in the cooperation. The membership of the cooperation set is known by the MSs and the BSs in the set. The MSs can be combined so that the intersection of their diversity sets contains as many BSs as possible.

Figure 5:
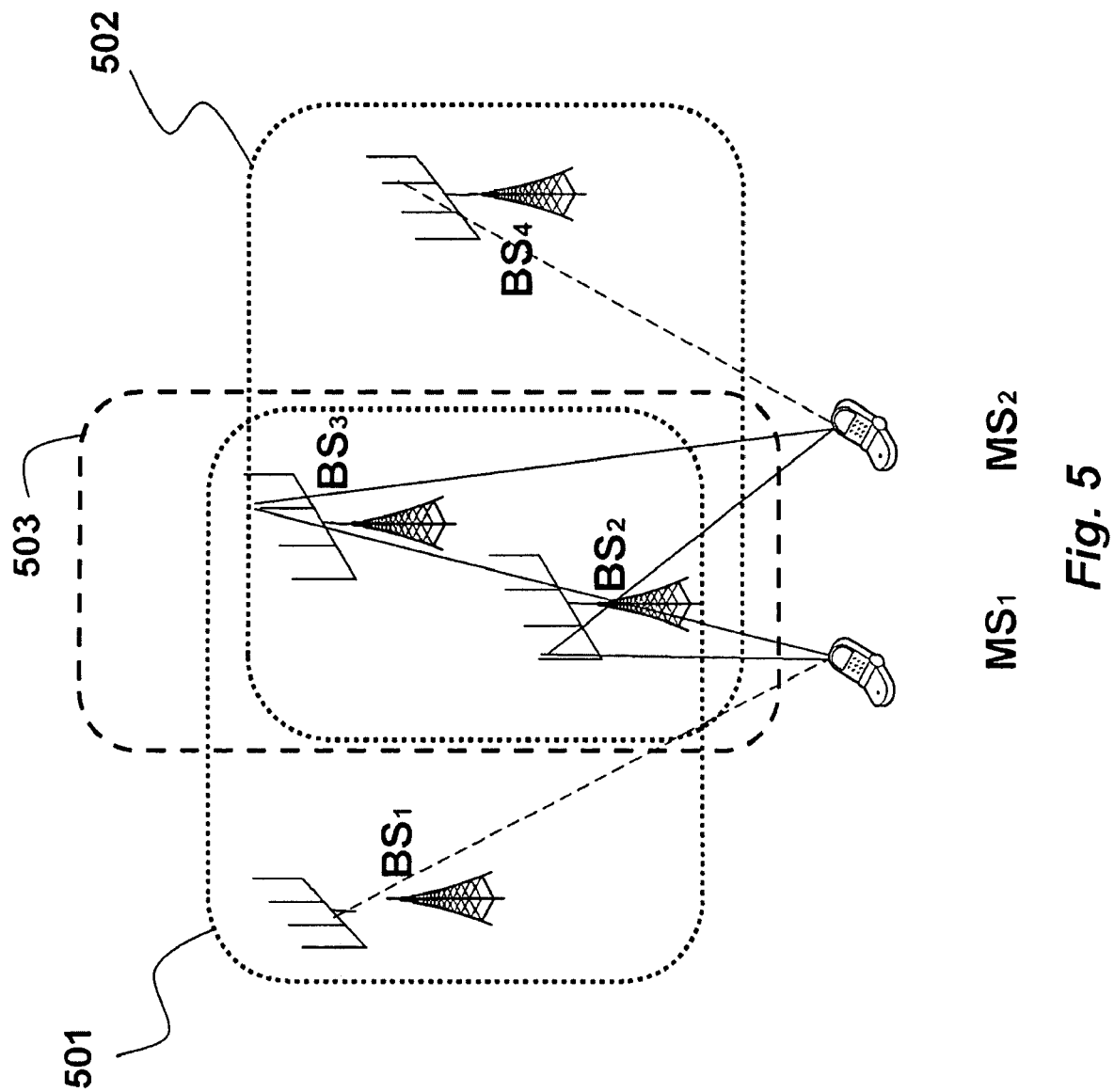
FIG. 5 is schematic of cooperation according to embodiments of the invention.

FIG. 5 shows our cooperative communication schematically. The $MS_1$ has a diversity set 501 ($BS_1$, $BS_2$, $BS_3$). The $MS_2$ has a diversity set 502 ($BS_2$, $BS_3$, $BS_4$). The members of the diversity sets and the MSs ($MS_1$, $MS_2$) are combined to form the cooperation set by taking the intersection of diversity sets 501 and 502 and the MSs associated with the diversity sets, e.g., ($BS_1$, $BS_2$, $BS_3$, $BS_4$, $MS_1$, $MS_2$).

Each MS in the HO region knows which BSs are in its diversity set. Each BS also knows it is in which MSs' diversity set. Given the existence of infrastructure 105, the communications among BSs is much easier than that among MSs. Therefore, it is preferred to let all the BSs exchange information, e.g., the membership of diversity set for each MS, and decide how the cooperation set can be formed, and which BS serves as the anchor for the cooperation. The combining of the BS and the MS into the cooperation set can be performed using the MDHO and the SDMA protocols.

Cooperation Set Update

Figure 6:
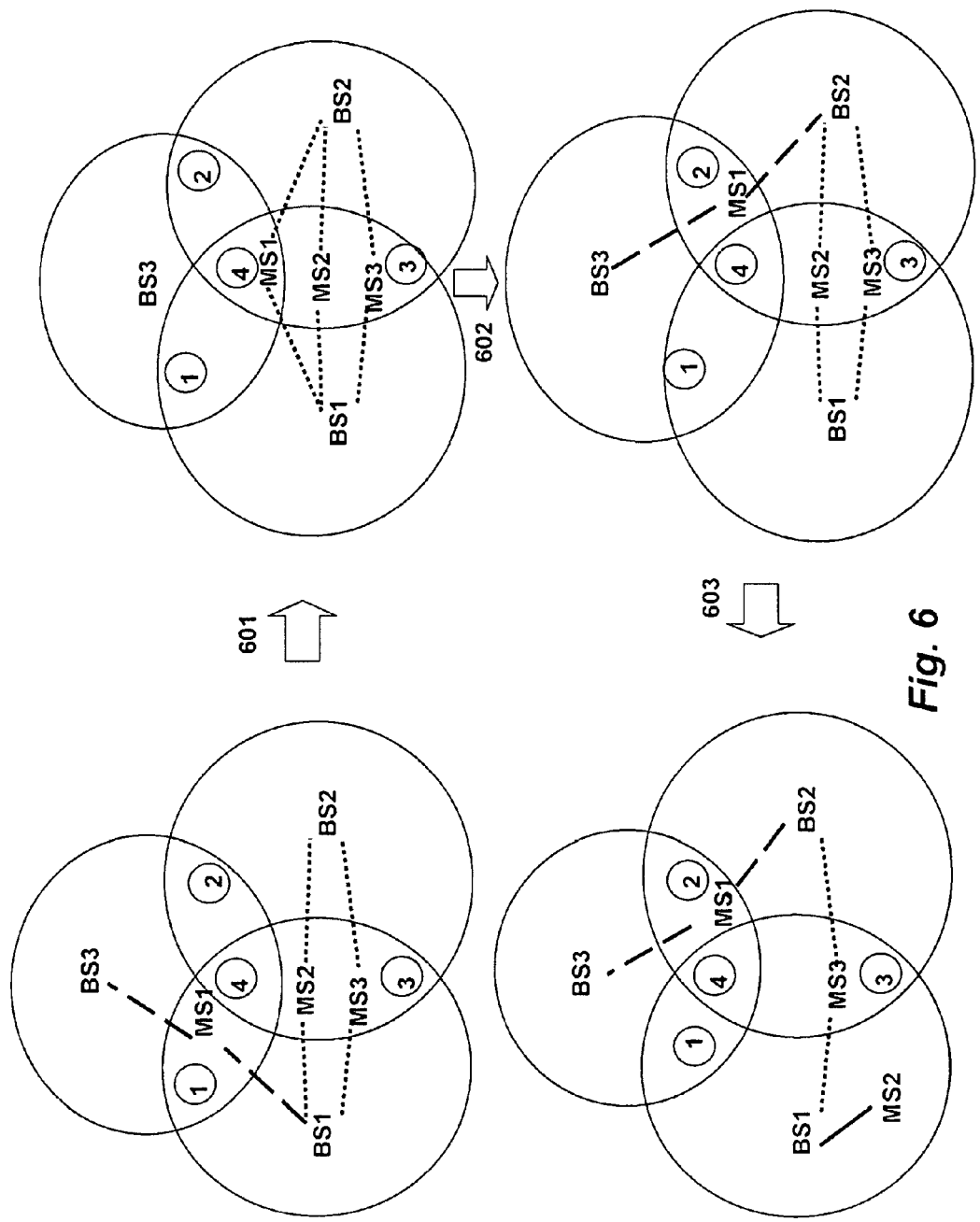
FIG. 6 is a schematic of establishment, update, and termination of a cooperation set according to embodiments of the invention.

As shown schematically in FIG. 6, the update of the cooperation set can be in response to (1) movement of the MSs or (2) a suboptimal grouping decision that makes cooperation difficult or impossible. In the first case, the movement of MS can cause its diversity set to change, which consequently leads to a change of the cooperation set. For example, the MSs can move out of or into the HO region, thereby causing a diversity set with only the anchor BS, and making cooperation impossible. Eventually, the cooperation set is terminated for that particular MS. In the second case, the cooperation set is updated upon the request of regrouping made by BS. This process is described in greater detail below.

Transmission in Each Frame

Within each frame, the switch from one zone to another, e.g., AAS zone to STC zone, is indicated by a Zone Switch information element (IE). The IEEE 802.16 standard specifies the support of MDHO in STC zone and the support of SDMA in both STC and AAS zone.

Before data are transmitted, some DL and UL MAP IEs are broadcast (communicated) to inform MSs of the resource allocation and function indications. To improve spectral efficiency, the same channel resource (frequency band and time slot) is allocated to the MSs in the same cooperation set.

Pilot pattern allocation is specific for different permutations, e.g., FUSC, PUSC, AMC, TUSC1, TUSC2, etc. The patterns are indicated in the zone switch IE (OFDMA_AAS_DL/UL_IE or OFDMA_STC_DL/UL_Zone_IE) or AAS_SDMA_DL/UL_IE in AAS zone and SDMA_Compact_DL/UL_MAP_IE in STC zone.

Furthermore, the anchor BS indicates the active transmit antennas in the cooperation set. As each BS in the cooperation set has multiple antennas, the MSs can be notified of the number of the active transmit antennas by the number of multiple coding/modulation layers, the CID for each layer, and the layer index. This can be realized by a MIMO_in_Another_BS_IE or Macro_MIMO_DL_Basic_IE or SDMA_Compact_DL_MAP_IE.

To reduce redundant information to the MS, an alternative way to combine the functions of the above IEs is to let the BS transmit a STC_BS_Cooperation_DL_IE, which is shown in Table 5. In the conventional MDHO, the BS can transmit MIMO_in_Another_BS_IE to indicate that data are transmitted to the MS via other BS during the same subframe. If the BS and the MS support some diversity combining, e.g., RF combining or soft data combining, the BS can transmit the Macro_MIMO_DL_Basic_IE to indicate the packet index for each data region. A data region is defined as one or more contiguous subchannels and one or more contiguous symbols in a subframe.

The MS performs soft data combining for the regions with the same packet index. Note that in the cooperation, one more dimension of user index is indicated along with the packet index for each data region so that each MSs in the cooperation set only focus on its own packets and perform the decoding correspondingly, combining its own packets from different data regions. Therefore, either the Macro_MIMO_DL_Basic_IE can be updated as in Table 4, or a new DL_IE is used to support the cooperation.

Precoding is performed at BSs prior to the downlink transmission. The MSs can decode the signals from BSs after estimate the precoded channel from each BS using the pilots. Precoding is not required at the MSs during the uplink transmission, while the transmit power of MS can be indicated by BS within the UL_IE.

There are two ways to broadcast the IE for cooperation notification. One way is to transmit both the SDMA-related IE and the updated MDHO-related IE sequentially, which can cause some redundancy. The other way is to transmit a new IE, which efficiently combines SDMA and MDHO functions.

The STC_BS_Cooperation_DL_IE in STC Zone and AAS_BS_Cooperation_DL_IE in AAS zone according to the embodiments of the invention are shown in Tables 5 and 6, respectively. As a consequence, we provide an update to Extended-2 DIUC code assignment for DIUC=14, as shown in Table 3.

Cooperation Method

Figure 7:
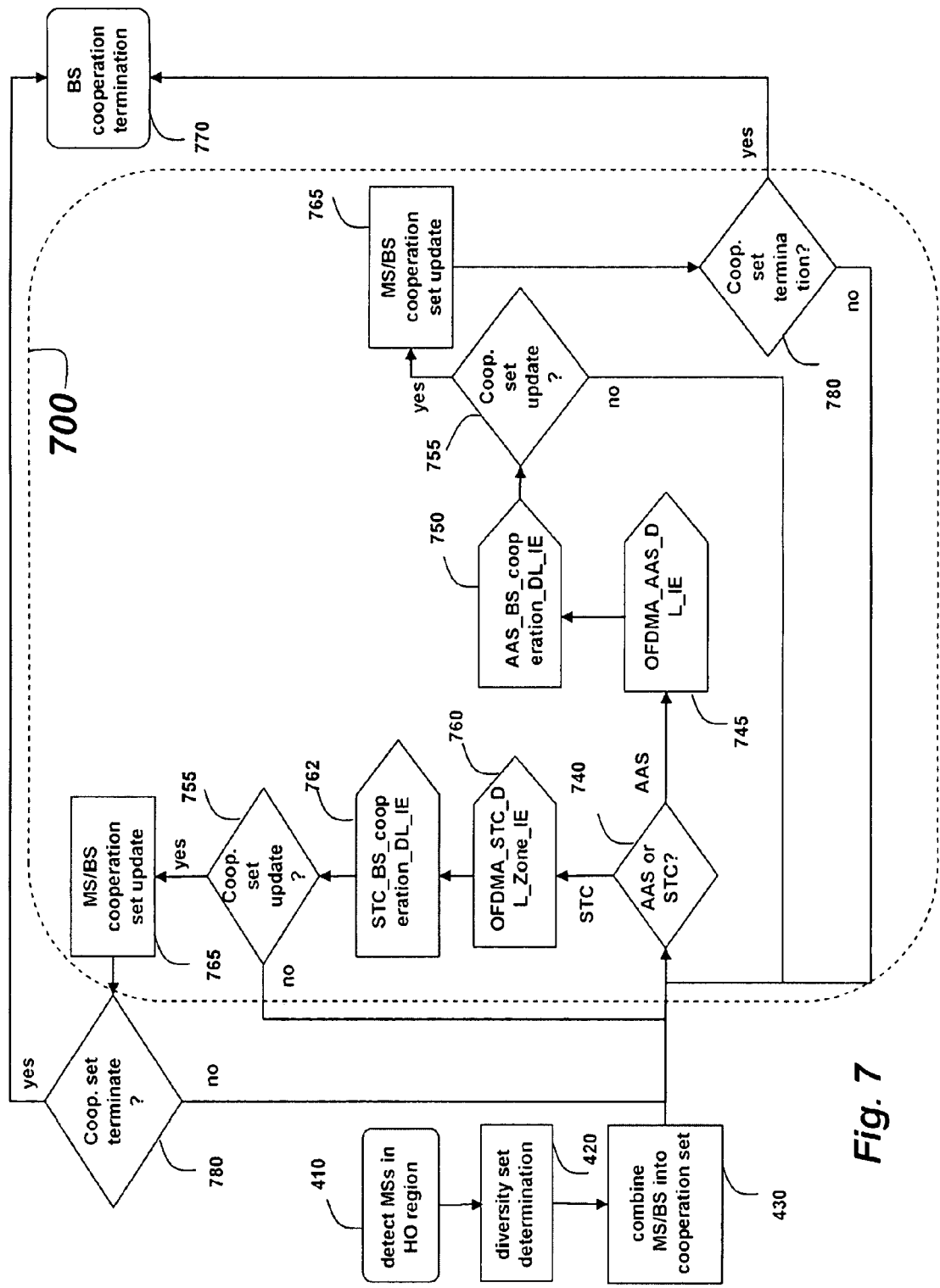
FIG. 7 is a flow diagram for cooperation according to embodiments of the invention.

FIG. 7 shows the details of the method for communicating cooperatively 700 between stations in a wireless cellular network according to embodiments of the invention. Cooperation begins when multiple MSs are detected 410 in the same HO region 106. After diversity sets are established 420 for each of mobile station, the MSs and BSs in the diversity sets are combined 430 to form the cooperation set.

The BSs can exchange information through the backbone 105 and reach a decision as to how to combine the BSs and the MS to form the cooperation set and select the anchor BS for the cooperation set. Cooperative communication 700 within each frame begins by determining 740 whether to switch between STC or AAS zones. For the AAZ zone, transmit OFDM_AAS_DL_IE 745 followed by AAS_BS_cooperation_DL_IE 750. For STC zone transmit OFDMA_STC_DL_Zone_IE 760 followed by STC_BS_cooperation_DL_IE 762.

In either mode, transmission occurs on a frame-by-frame basis. Later on, the cooperation set may determine 755 to update 765, due to MS mobility or better grouping and anchor selection is available. Upon the completion of the update 765, the decision 780 for whether to terminate cooperation can be made. It may be necessary to terminate cooperation, for example, if the cooperation set update 765 yields an empty set. If cooperation is to continue, the previous transmission procedure can be repeated.

Cooperation Set Termination

The cooperation can be terminated for the following reasons. First, an MS may have to switch to conventional MDHO when only the anchor BS is left in the cooperation set. This can occur when another MS that, was in the same cooperation set as this MS is removed from its diversity set. In this case, the anchor BS can switch to conventional MDHO and allocate different resources for these two MSs.

Second, the cooperation can terminate when the cooperation set only has one non-anchor BS or no BS at all. This means that the intersection of the diversity set of all the MSs belonging to the same cooperation set does not include the anchor BS of some MS. Therefore, the update of the cooperation set is needed for a next round of cooperation. Before the update, each MS can perform HO separately using different resources.

Third, the cooperation terminates when some MS moves out of the handover region. In this case, the MS has only the anchor BS in its diversity set, and handover is performed for this MS. As a consequence, there may be some MS left in the cooperation set, causing that MS to switch to conventional MDHO. When there are multiple MSs in the set because of the handover of the other MSs, the MSs can be grouped into a new cooperation set if there are two or more BSs in the intersection of their diversity sets.

FIG. 6 shows a life cycle of the cooperation set. There are four handover regions marked with circled 1 to 4 at the common boundaries of cells of three BSs ($BS_1$, $BS_2$, $BS_3$). Initially, $MS_1$ is in HO region 1, while both $MS_2$ and $MS_3$ are in HO region 3. Then $MS_2$ and $MS_3$ form a cooperation set with $BS_1$ and $BS_2$, as indicated by the dotted lines. The $MS_1$ can initially perform conventional MDHO with $BS_1$ and $BS_3$.

If after some time, $MS_1$ moves 601 into region 4, then the $MS_1$ can join the cooperation set of the $MS_2$ and $MS_3$ to perform cooperation with $BS_1$ and $BS_2$.

Later, if $MS_1$ moves 602 into region 2, then the cooperation set is updated by removing $MS_1$. Then, when $MS_2$ moves 603 out of region 4, and well inside the cell of $BS_1$, then the cooperation set is terminated by a handover for $MS_2$, and $MS_3$ can perform conventional MDHO with $BS_1$ and $BS_2$.

MAC Signaling

The MAC messages and information elements (IE) as described above are detailed in the following tables. Fields used by the embodiments of the invention are indicated in bold.

TABLE 1

Handover Support

| Type | Length | Value | Scope |
|---|---|---|---|
| 27 | 1 | Bit 0: MDHO/FBSS HO not supported when it is set to 1. When this bit is set to 1, the BS shall ignore all other bits.<br>Bit 1: FBSS/MDHO DL RF Combining supported with monitoring MAPs from active BSs when this bit is set to 1<br>Bit 2: MDHO DL soft Combining supported with monitoring single MAP from anchor BS when this bit is set to 1. | REG-REQ REG-RSP |

TABLE 1-continued

Handover Support

| Type | Length | Value | Scope |
|---|---|---|---|
| | | Bit 3: MDHO DL soft combining supported with monitoring MAPs from active BSs when this bit is set to 1<br>Bit 4: MDHO UL Multiple transmission Bits<br>Bit 5: cooperation supported if set to 1<br>#6-7: Reserved, shall be set to zero | |

TABLE 2

SDMA Pilot capability

| Type | Length | Value | Scope |
|---|---|---|---|
| 178 | 1 | Bits 0-1: SDMA pilot pattern Support for AMC zone:<br>0b00 - No support<br>0b01 - Support SDMA pilot patterns #A and #B<br>0b11 - Support all SDMA pilot patterns<br>0b10 - Reserved<br>Bits 2: cooperation supported if set to 1<br>Bits 3-7: Reserved | SBC-REQ,<br>SBC-RSP |

TABLE 3

Extended-2 DIUC code assignment for DIUC = 14

| Extend-2 DIUC | Usage |
|---|---|
| 00 | MBS MAP IE |
| 01 | HO Anchor Active DL MAP IE |
| 02 | HO Active Anchor DL MAP IE |
| 03 | HO CID Translation MAP IE |
| 04 | MIMO in Anchor BS IE |
| 05 | Macro-MIMO DL Basic IE |
| 06 | Skip IE |
| 07 | HARQ DL MAP IE |
| 08 | HARQ ACK IE |
| 09 | Enhanced DL MAP IE |
| 0A | Closed-loop MIMO DL Enhanced IE |
| 0B | STC BS Cooperation DL IE |
| 0C-0D | Reserved |
| 0E | AAS SDMA DL IE |
| 0F | AAS BS Cooperation DL IE |

TABLE 4

Macro MIMO DL Basic IE

| Syntax | Size (bit) | Notes |
|---|---|---|
| Macro_MIMO_DL_Basic_IE( ) { | — | — |
|   Extended-2 DIUC | 4 | Macro MTMO DL Basic IE = 0x05 |
|   Length | 8 | Variable |
|   Segment | 2 | Segment number |
|   Used subchannels | 6 | Used subchannels group at BS:<br>One bit per subchannel group |
|   Num_Region | 4 | — |
|   For (i = 0; i < Num_Region; i++) { | — | — |
|     OFDMA Symbol offset | 8 | — |
|     Subchannel offset | 6 | — |
|     Boosting | 3 | — |
|     No. OFDMA symbols | 7 | — |
|     No. Subchannels | 6 | — |
|     Matrix indicator | 2 | See matrix indicator defined in STC DL Zone IE |
|     Num_layer | 2 | — |
|     Reserved | 2 | Shall be set to zero |
|     for (j= 0; j < Num_layer; j++) { | — | — |
|       if (INC_CID == 1) { | — | — |
|         CID | 16 | — |
|       } | — | — |
|       Layer_index | 2 | — |
|       Packet index | 4 | Packet index for each layer in region |
|       DIUC | 4 | 0-11 burst profiles |
|       Reserved | 2 | Shall be set to zero |
|     } | — | — |
|   } | — | — |
|   Padding | variable | Padding to byte; shall be set to zero |
| } | — | — |

TABLE 5

STC BS Cooperation DL IE format

| Syntax | Size (bit) | Notes |
|---|---|---|
| STC_BS Cooperation DL IE( ) { | — | — |
|   Extended-2 DIUC | 4 | STC_BS Cooperation DL IE = 0x0B |
|   Length | 8 | Variable |
|   Segment | 2 | Segment number |
|   Used subchannels | 6 | Used subchannels groups at other BS's sector: Bit #0: Subchannel group 0 Bit #1: Subchannel group 1 Bit #2: Subchannel group 2 Bit #3: Subchannel group 3 Bit #4: Subchannel group 4 Bit #5: Subchannel group 5 |
|   Num_Region | 4 | — |
|   For (i = 0; i < Num_Region; i++) { | — | — |
|     OFDMA Symbol offset | 8 | — |
|     Subchannel offset | 6 | — |
|     Boosting | 3 | — |
|     No. OFDMA symbols | 7 | — |
|     No. Subchannels | 6 | — |
|     Matrix indicator | 2 | See matrix indicator defined in STC DL Zone IE |
|     Num_layer | 2 | — |
|     Reserved | 2 | Shall be set to zero |
|     for (j = 1 ; j < Num_layer; j++) { | — | This loop specifies the $N_{EP}$ for layers 2 and above when required for STC. The same $N_{SCH}$ and RCID applied for each layer |
|       RCID | variable | MS identifier for the current layer |
|       Layer_index | 2 | — |
|       Packet index | 4 | Packet index for each layer within each region |
|       if (HARQ Mode = CTC Incremental Redundancy) { NEP } elseif (HARQ Mode = Generic Chase) { DIUC } | 4 | HARQ mode is specified in the HARQ Compact DL-MAP IE format for switch HARQ mode |
|       CQI Feedback_type | 3 | Type of contents on CQICH for this MS 0b000 = Default feedback 0b001 = Precoding weight matrix W 0b010 = Channel matrix H 0b011 = MIMO mode and permutation zone 0b100-0b111 = Reserved |
|       CQICH_Num | 2 | Total number of CQICHs assigned to this MS is (CQICH_Num +1) |
|       for (i = 1; i < CQICH_Num; i++) { | — | — |
|         Allocation index | 6 | index to uniquely identify the additional CQICH resources assigned to the MS |
|       } | — | — |
|       DIUC | 4 | 0-11 burst profiles |
|       Reserved | 2 | Shall be set to zero |
|     } | — | — |
|   } | — | — |
|   Padding | variable | Padding to byte; shall be set to zero |
| } | — | — |

TABLE 6

AAS BS Cooperation DL IE format

| Syntax | Size (bit) | Notes |
|---|---|---|
| AAS BS Cooperation DL IE( ){ | — | — |
| Extended-2 DIUC | 4 | AAS BS Cooperation DL IE( ) = 0x0F |
| Length | 8 | variable |
| Segment | 2 | Segment number |
| Used subchannels | 6 | Used subchannels groups at other BS's sector: Bit #0: Subchannel group 0 Bit #1: Subchannel group 1 Bit #2: Subchannel group 2 Bit #3: Subchannel group 3 Bit #4: Subchannel group 4 Bit #5: Subchannel group 5 |
| RCID_Type | 2 | 0b00 = Normal CID 0b01 = RCID11 0b10 = RCID7 0b11 = RCID3 |
| Num Burst Region | 4 | — |
| Reserved | 2 | Shall be set to zero. |
| For (ii = 1: Num Region) { | — | — |
| OFDMA symbol offset | 8 | Starting symbol offset referenced to DL preamble of the DL frame specified by the Frame Offset |
| Boosting | 3 | |
| If (Zone Permutation is AMC, TUSC1,or TUSC2){ | — | — |
| Subchannel offset | 8 | — |
| No. OFDMA triple symbols | 5 | Number of OFDMA symbols is given in multiples of 3 |
| No. subchannels | 6 | — |
| } Else { | — | — |
| Subchannel offset | 6 | — |
| No. OFDMA symbols | 7 | — |
| No. subchannels | 6 | — |
| } | — | — |
| Number of Users | 3 | SDMA users for the assigned region |
| Reserved | 2 | Shall be set to zero |
| For (jj = 1: Num_Users) { | — | — |
| RCID_IE( ) | variable | — |
| Encoding Mode | 2 | 0b00: No HARQ 0b01: HARQ Chase Combining 0b10: HARQ Incremental Redundancy 0b11: HARQ Conv. Code Incremental Redundancy |
| Packet index | 4 | Packet index for each user within each region |
| CQICH Allocation | 1 | 0: Not included 1: included |
| ACKCH Allocation | 1 | 0: Not included 1: Optionally included for HARQ users |
| Pilot Pattern Modifier | 1 | 0: Not applied 1: Applied Shall be set to 0 if PUSC AAS zone |
| If (AAS DL Preamble Used){ | — | — |
| Preamble Modifier Index | 4 | Preamble Modifier Index |
| } | — | — |
| If (Pilot Pattern Modifier) { | — | — |
| Pilot Pattern | 2 | See 8.4.6.3.3 (AMC), 8.4.6.1.2.6 (TUSC) 0b00: Pattern #A 0b01: Pattern #B 0b10: Pattern #C 0b11: Pattern #D |
| Reserved | 1 | Shall be set to zero |
| } Else { | — | — |
| Reserved | 3 | Shall be set to zero |
| } | — | — |
| If (Encoding Mode == 00) { | — | No HARQ |
| DIUC | 4 | — |
| Repetition Coding Indication | 2 | 0b00: No repetition 0b01: Repetition of 2 0b10: Repetition of 4 0b11: Repetition of 6 |
| Reserved | 2 | Shall be set to zero. |
| } | — | — |
| If (Encoding Mode == 01) { | — | HARQ Chase Combining |
| If (ACKCH Allocation) { | — | — |
| ACK CH Index | 5 | — |
| } Else { | — | — |
| Reserved | 1 | Shall be set to zero |
| } | — | — |
| DIUC | 4 | — |
| Repetition Coding Indication | 2 | 0b00: No repetition 0b01: Repetition of 2 0b10: Repetition of 4 0b11: Repetition of 6 |
| ACID | 4 | — |
| AI_SN | 1 | — |
| } | — | — |
| If (Encoding Mode == 10) { | — | HARQ Incremental Redundancy |
| If (ACKCH Allocation) { | — | — |
| ACK CH Index | 5 | See DL Ack channel index in 8.4.5.4.24 |
| } Else { | — | — |
| Reserved | 1 | Shall be set to zero. |
| } | — | — |
| $N_{EP}$ | 4 | — |
| $N_{SCH}$ | 4 | indicator for the number of first slots used for data encoding in this SDMA allocation region |
| SPID | 2 | — |
| ACID | 4 | — |
| AI_SN | 1 | — |
| } | — | — |
| If (Encoding Mode == 11) { | — | HARQ Conv. Code Incremental Redundancy |
| If (ACKCH Allocation) { | — | — |
| ACK CH Index | 5 | See DL Ack channel index in 8.4.5.4.24 |
| Reserved | 9 | Shall be set to zero |
| } Else { | — | — |
| Reserved | 3 | Shall be set to zero |
| } | — | — |
| DIUC | 4 | — |
| Repetition Coding Indication | 2 | 0b00: No repetition 0b01: Repetition of 2 0b10: Repetition of 4 0b11: Repetition of 6 |
| SPID | 2 | — |
| ACID | 4 | — |
| AI_SN | 1 | — |
| } | — | — |
| If (CQICH Allocation Included) { | — | — |
| Allocation Index | 6 | Index to the channel in a frame the CQI report should be transmitted by the SS |
| Period (p) | 3 | A CQI feedback is transmitted on the CQI channels indexed by the (CQI Channel Index) by the SS in every $2^p$ frames |

TABLE 6-continued

AAS BS Cooperation DL IE format

| Syntax | Size (bit) | Notes |
|---|---|---|
| Frame offset | 3 | The MS starts reporting at the frame of which the number has the same 3 LSB as the specified frame offset. If the current frame is specified, the MS should start reporting in eight frames |
| Duration (d) | 4 | A CQI feedback is transmitted on the CQI channels indexed by the (CQI Channel Index) by the SS for $2^{(d-1)}$ frames. If d is 0b0000, the CQICH is deallocated. If d is 0b1111, the MS should report until the BS command for the MS to stop. |
| } | — | — |
| } | — | End of User loop |
| } | — | End of Burst Region Loop |
| Padding | variable | — |
| } | — | — |

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

OFDMA

Orthogonal frequency-division multiplexing (OFDM) is a modulation technique used at the physical layer (PHY) of a number of wireless networks, e.g., networks designed according to the IEEE 802.11a/g, and IEEE 802.16/16e standards. OFDMA is a multiple access scheme based on OFDM. In OFDMA, separate sets of orthogonal tones (subchannels) and time slots are allocated to multiple transceivers (users) so that the transceivers can communicate concurrently.

WiMAX

The IEEE 802.16 standard defines an air interface for mobile communications. The Worldwide Interoperability for Microwave Access (WiMAX) is a telecommunications technology aimed at providing wireless data in a variety of ways, from point-to-point links to full cellular type access. WiMAX is based on the IEEE 802.16 standard.

Slot: A slot is the minimum resource unit allocated to an MS in the UL and the DL. A slot is two-dimensional and is measured in time duration and frequency subchannels. Zone: A zone is one or more (time-wise) contiguous columns of symbols.

Data Region: In OFDMA, a data region is a two-dimensional allocation of a group of contiguous subchannels, in a group of contiguous OFDMA symbols. A two-dimension allocation of a data region may be visualized as a rectangle, such as the 4×3 rectangle of subchannels and symbols.

AAS zone: Adaptive antenna system (AAS) is an optional feature for a network designed according to the IEEE 802.16 standard. AAS uses multiple antennas to improve system coverage and capacity by directing transmitted signals at specific receiving antennas. AAS can 'steer' RF beams spatially, which increases spectral reuse and diversity gain. The AAS zone is a period of time that is dedicated for AAS-supported MSs during each frame.

STC zone: Space-time coding (STC) is an optional feature for and IEEE 802.16 network and is defined in the standards. STC uses multiple transmit antennas to improve the reliability of data transmission in wireless communication systems. STC transmits multiple, redundant copies of a data stream to the receiver to increase the probability of reliable decoding. The STC zone is a period of time that is dedicated for STC-supported MSs during each frame.

Permutation Zone: A permutation zone is a number of contiguous OFDMA symbols in the DL or the UL. A permutation zone can include multiple MSs that use the same permutation formula. Both the UL subframe and the DL subframe can include more than one permutation zones.

Pilot Patterns: A pilot pattern is an allocation of pilot subchannels. In multi-user communications, e.g., transmission from BS to multiple MSs in the downlink as in SDMA or base station and mobile station cooperation, a receiver estimates the channel using orthogonal pilot patterns.

We claim:

1. A method for communicating cooperatively between base stations and mobile stations in a wireless cellular network, comprising:
   detecting at least two mobile stations in a handover region of a wireless cellular network;
   establishing a diversity set for each mobile station in the handover region, in which each diversity set identifies at least two base stations that can communicate with the associated mobile station;
   combining the at least two base stations and the at least two mobile stations into a cooperation set;
   allocating a resource to selected base stations and mobile stations of the cooperative set;
   notifying the selected base stations and mobile stations of the allocated resource; and
   communicating concurrently between the selected base stations and mobile stations of the cooperation set using the same allocated resource.

2. The method of claim 1, further comprising:
   exchanging messages between the base stations and the mobile stations to negotiate a capability of supporting the cooperative communication when the mobile stations enter the wireless cellular network.

3. The method of claim 1, further comprising:
   combining the mobile stations into the cooperation set if an intersection of the diversity sets of the mobile stations includes more than two base stations.

4. The method of claim 1, further comprising:
   selecting an anchor base station from the cooperation set.

5. The method of claim 4, in which the resource includes symbols in a time domain, and in which a zone is one or more contiguous symbols, and in which the anchor base station indicates the zone used for communication between the base stations and mobile stations of the cooperation set.

6. The method of claim 4, in which the anchor base station notifies the mobile stations in the cooperation set of the allocated resource in DL MAP information element (IE) and UL MAP IE.

7. The method of claim 6, in which the anchor base station uses the IE defined for macro diversity handover (MDHO) and spatial division multiple access (SDMA) separately to notify the mobile stations in the cooperation set of the allocated resource.

8. The method of claim 6, in which the anchor base station uses a single IE that is combined from the IE for the MDHO and the SDMA to notify the mobile stations in the cooperation set of the allocated resources.

9. The method of claim 6, in which the resource includes pilot patterns for different mobile stations.

10. The method of claim 6, in which the resource includes active transmit antennas on the base stations, indicated by the number, connection identifier, and the index of multiple coding/modulation layers.

11. The method of claim 6, further comprising:
indicating, by the anchor base station to the selected mobile stations, a user index and a packet index for different data regions.

12. The method of claim 6, further comprising:
indicating, by the anchor base station to the selected mobile stations, a diversity combining used at the mobile stations.

13. The method of claim 1, further comprising:
updating the cooperation set periodically or on demand.

14. The method of claim 1, further comprising:
updating the anchor base station periodically or on demand.

15. The method of claim 1, further comprising:
maintaining the cooperation set only as long as the cooperation set contains the at least two base stations and the at least two mobile stations.

16. The method of claim 1, in which the combining uses macro diversity handover messages.

17. The method of claim 1, in which the resource includes symbols and subchannels.

18. The method of claim 1, in which the subchannels include data subcarriers, and in which the mobile stations share the data subcarriers.

19. A system for communicating cooperatively between base stations and mobile stations in a wireless cellular network, comprising:
at least two mobile stations in a handover region of a wireless cellular network;
means for establishing a diversity set for each mobile station in the handover region, in which each diversity set identifies at least two base stations that can communicate with the associated mobile station;
means for combining the at least two base stations and the at least two mobile stations into a cooperation set;
means for allocating a resource to selected base stations and mobile stations of the cooperative set;
means for notifying the selected base stations and mobile stations of the allocated resource; and
means for communicating concurrently between the selected base stations and mobile stations of the cooperation set using the same allocated resource.

* * * * *